(12) United States Patent
Gonze et al.

(10) Patent No.: US 7,975,469 B2
(45) Date of Patent: Jul. 12, 2011

(54) ELECTRICALLY HEATED PARTICULATE FILTER RESTART STRATEGY

(75) Inventors: Eugene V. Gonze, Pinckney, MI (US); Michael J. Paratore, Jr., Howell, MI (US); Frank Ament, Troy, MI (US)

(73) Assignee: GM Global Technology Operations LLC

( * ) Notice: Subject to any disclaimer, the term of this patent is extended or adjusted under 35 U.S.C. 154(b) by 960 days.

(21) Appl. No.: 11/803,679

(22) Filed: May 15, 2007

(65) Prior Publication Data

US 2008/0282678 A1   Nov. 20, 2008

(51) Int. Cl.
*F01N 3/00* (2006.01)
*F01N 3/10* (2006.01)
*F01N 3/02* (2006.01)

(52) U.S. Cl. ............... 60/274; 60/295; 60/297; 60/300; 60/311

(58) Field of Classification Search .................... 60/295, 60/297, 300, 311, 274
See application file for complete search history.

(56) References Cited

U.S. PATENT DOCUMENTS

| 4,505,726 | A | 3/1985 | Takeuchi |
| 4,516,993 | A | 5/1985 | Takeuchi |
| 7,055,309 | B2 * | 6/2006 | Plote et al. ..................... 60/277 |
| 7,686,857 | B2 * | 3/2010 | Gonze et al. ................. 55/282.3 |

FOREIGN PATENT DOCUMENTS

| CN | 1238630 C | 1/2006 |
| CN | 1920267 A | 2/2007 |
| GB | 2412615 A | 10/2005 |

* cited by examiner

*Primary Examiner* — Thomas E. Denion
*Assistant Examiner* — Michael Carton

(57) ABSTRACT

A control system that controls regeneration of a particulate filter is provided. The system generally includes a propagation module that estimates a propagation status of combustion of particulate matter in the particulate filter. A regeneration module controls current to the particulate filter to re-initiate regeneration based on the propagation status.

23 Claims, 7 Drawing Sheets

ELECTRICALLY HEATED PARTICULATE FILTER RESTART STRATEGY

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD

The present disclosure relates to methods and systems for heating particulate filters.

BACKGROUND

The statements in this section merely provide background information related to the present disclosure and may not constitute prior art.

Diesel engines typically have higher efficiency than gasoline engines due to an increased compression ratio and a higher energy density of diesel fuel. A diesel combustion cycle produces particulates that are typically filtered from diesel exhaust by a particulate filter (PF) that is disposed in the exhaust stream. Over time, the PF becomes full and the trapped diesel particulates must be removed. During regeneration, the diesel particulates are burned within the PF.

Some regeneration methods ignite particulate matter present on the front of the PF via a front surface heater. Regeneration of particulate matter present inside the PF is then achieved using the heat generated by combustion of particulate matter present near the heated face of the PF or by the heated exhaust passing through the PF. In some cases, the combustion of the particulate matter at the face of the PF can be extinguished before the flame reaches the end of the PF. In such cases, the rear of the PF could become heavily loaded with particulate matter.

SUMMARY

Accordingly, a control system that controls regeneration of a particulate filter is provided. The system generally includes a propagation module that estimates a propagation status of combustion of particulate matter in the particulate filter. A regeneration module controls current to the particulate filter to re-initiate regeneration based on the propagation status.

In other features, a method that controls regeneration of a particulate filter is provided. The method generally includes: estimating a propagation status of combustion of particulate matter in the particulate filter; and controlling current to the particulate filter to re-initiate regeneration of the particulate filter based on the propagation status.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3:
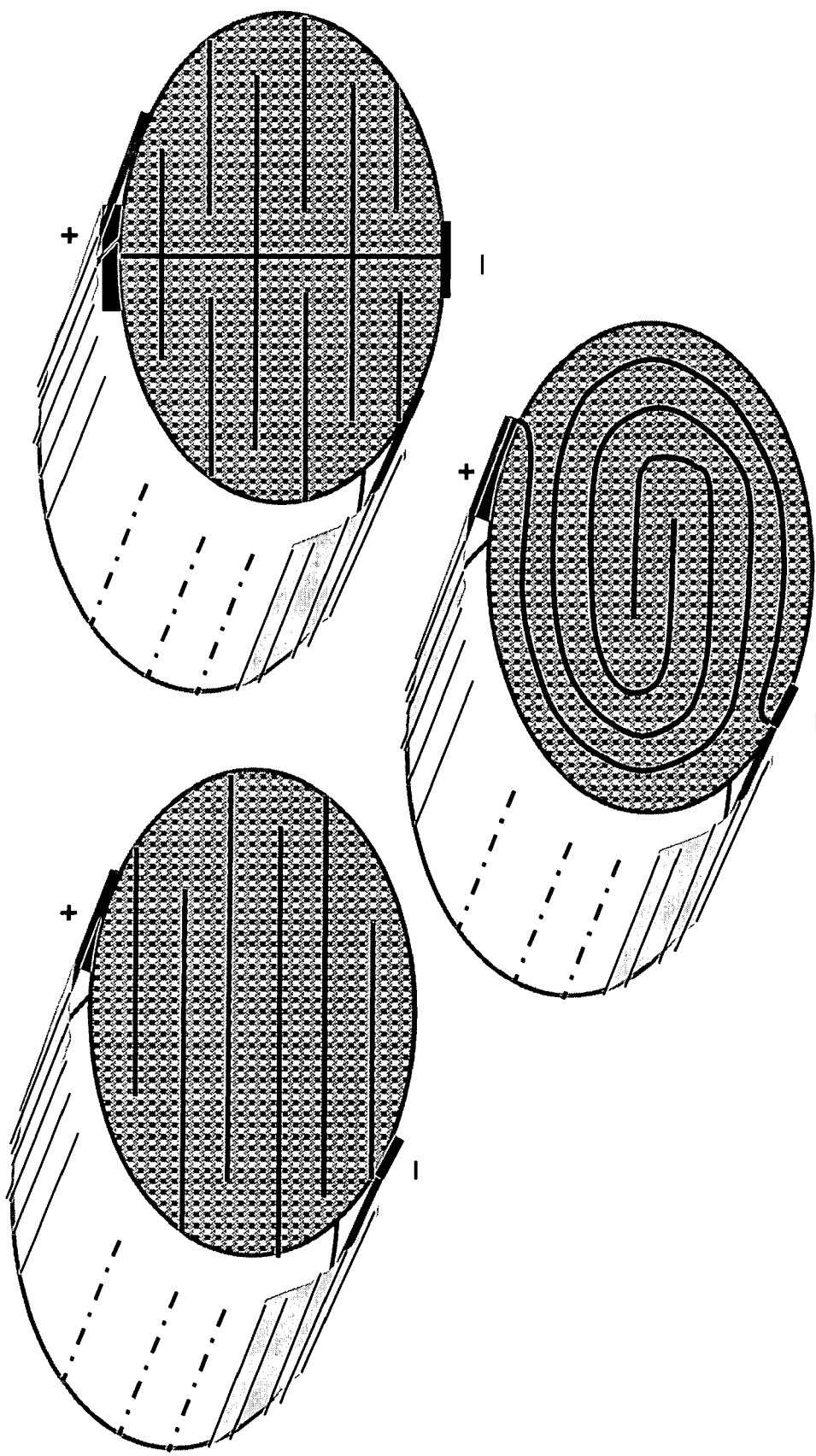

FIG. 3 includes perspective views of exemplary front faces of exemplary particulate filters illustrating various patterns of resistive paths.

Figure 4:
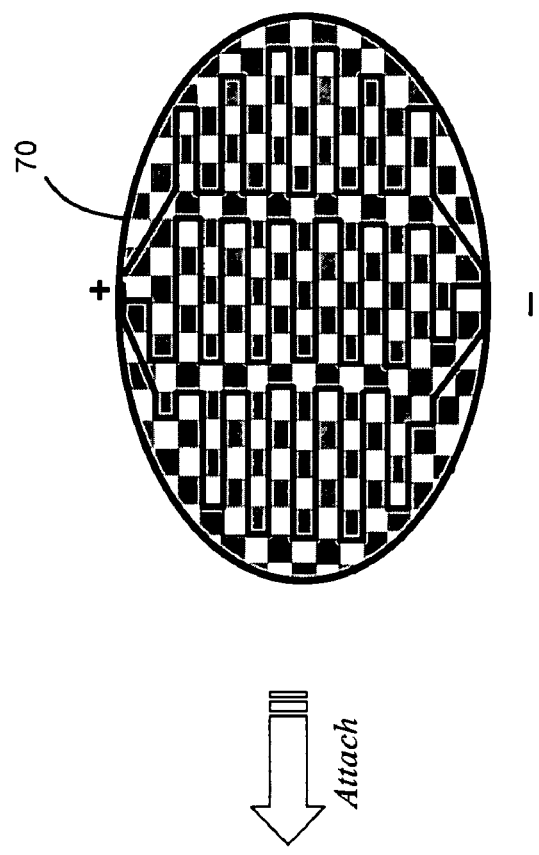
Figure 4:
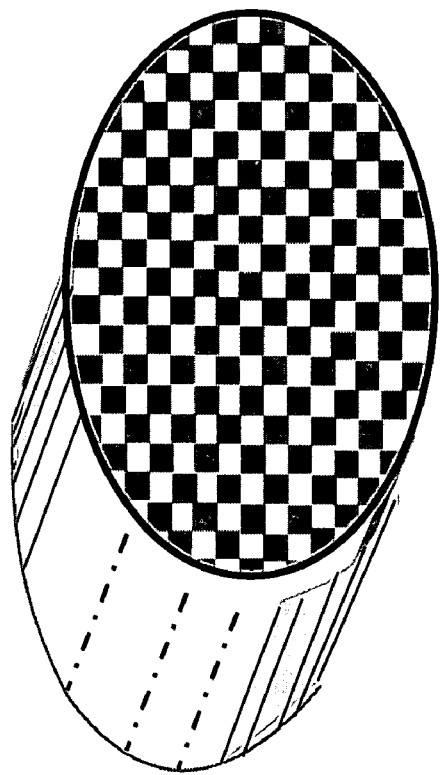

FIG. 4 is a perspective view of a front face of an exemplary particulate filter and a heater insert.

Figure 2:
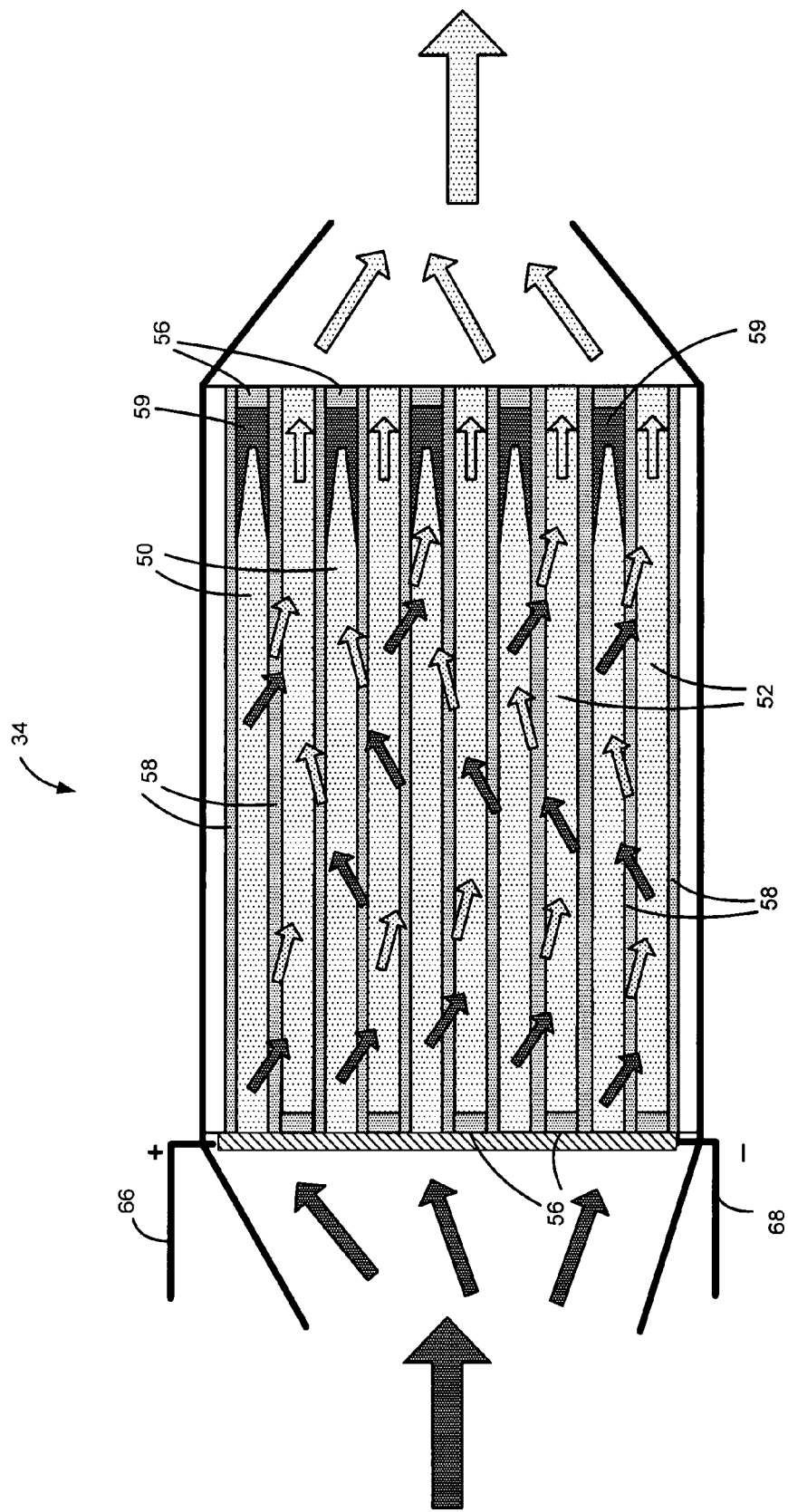
FIG. 2 is a cross-sectional view of an exemplary wall-flow monolith particulate filter.
Figure 5:
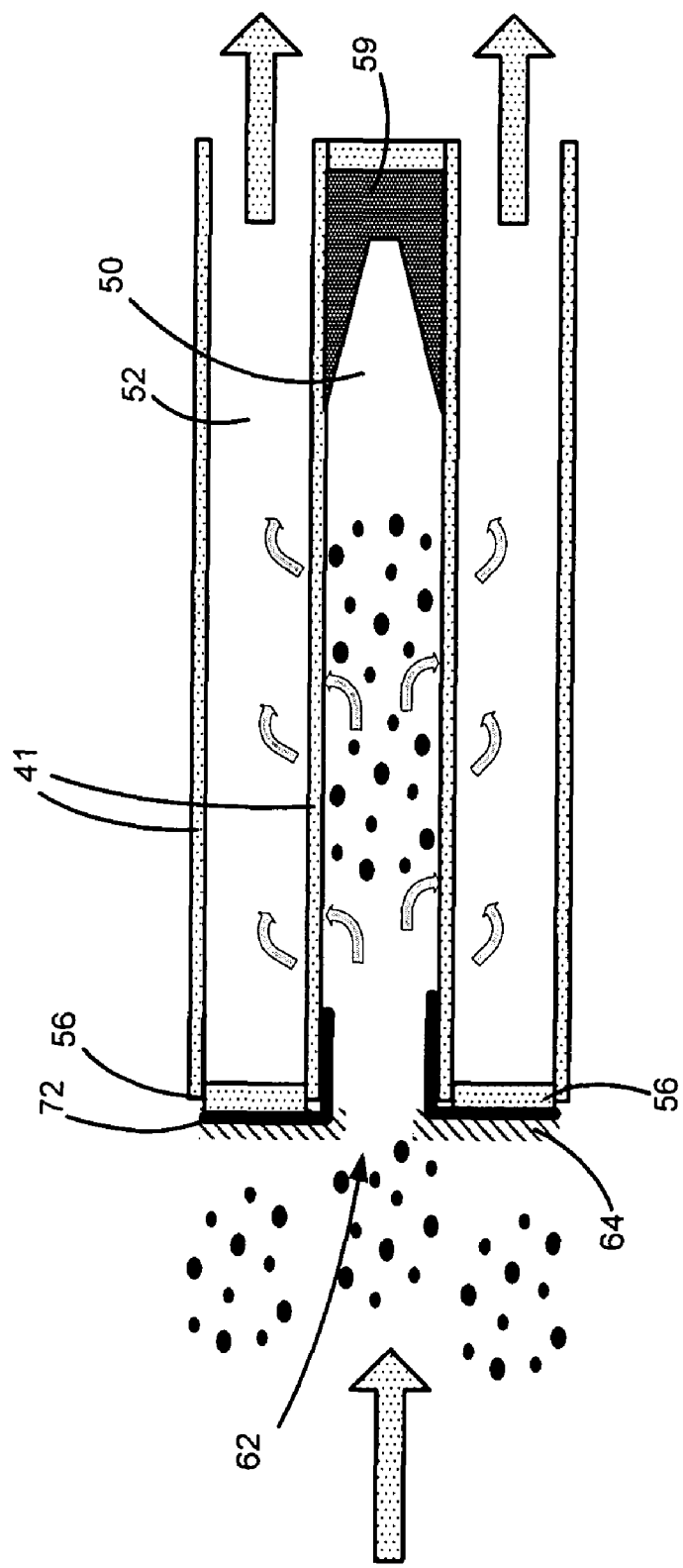

FIG. 5 is a cross-sectional view of a portion of the exemplary particulate filter of FIG. 2 including a conductive coating.

Figure 6:
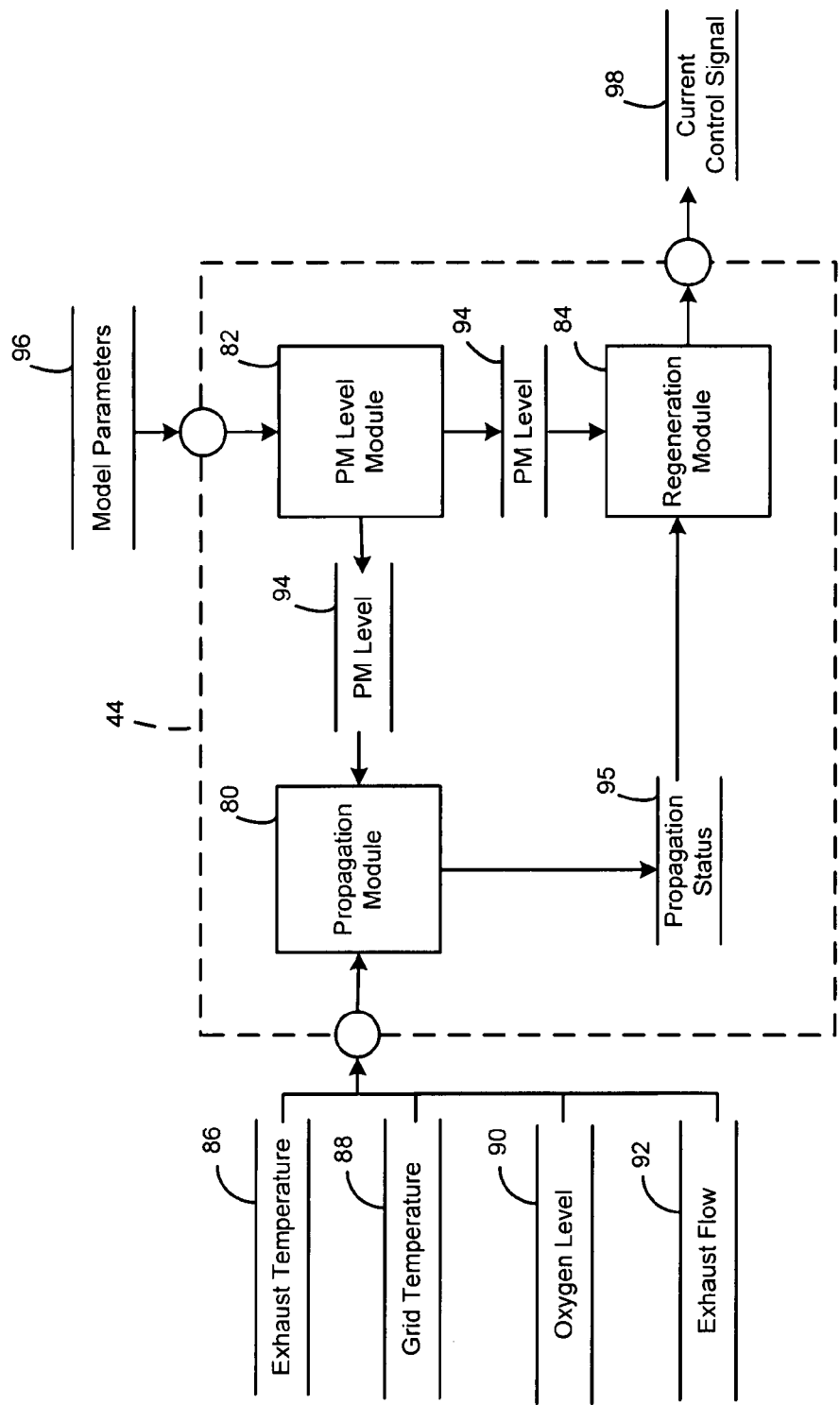

FIG. 6 is a dataflow diagram illustrating and exemplary particulate filter regeneration restart system according to various aspects of the present disclosure.

Figure 7:
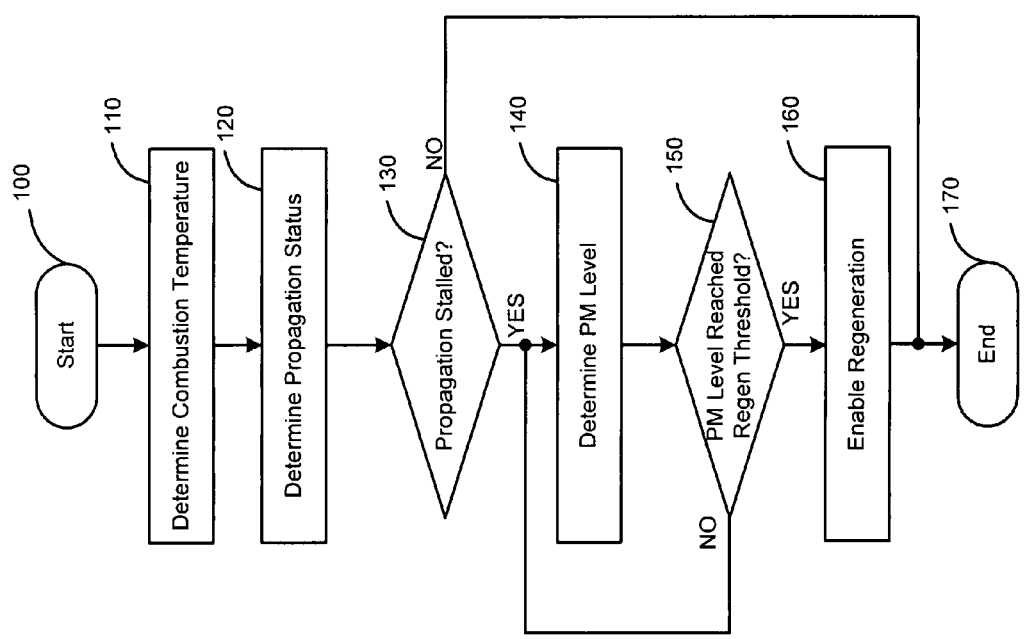

FIG. 7 is a flowchart illustrating an exemplary particulate filter regeneration restart method according to various aspects of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
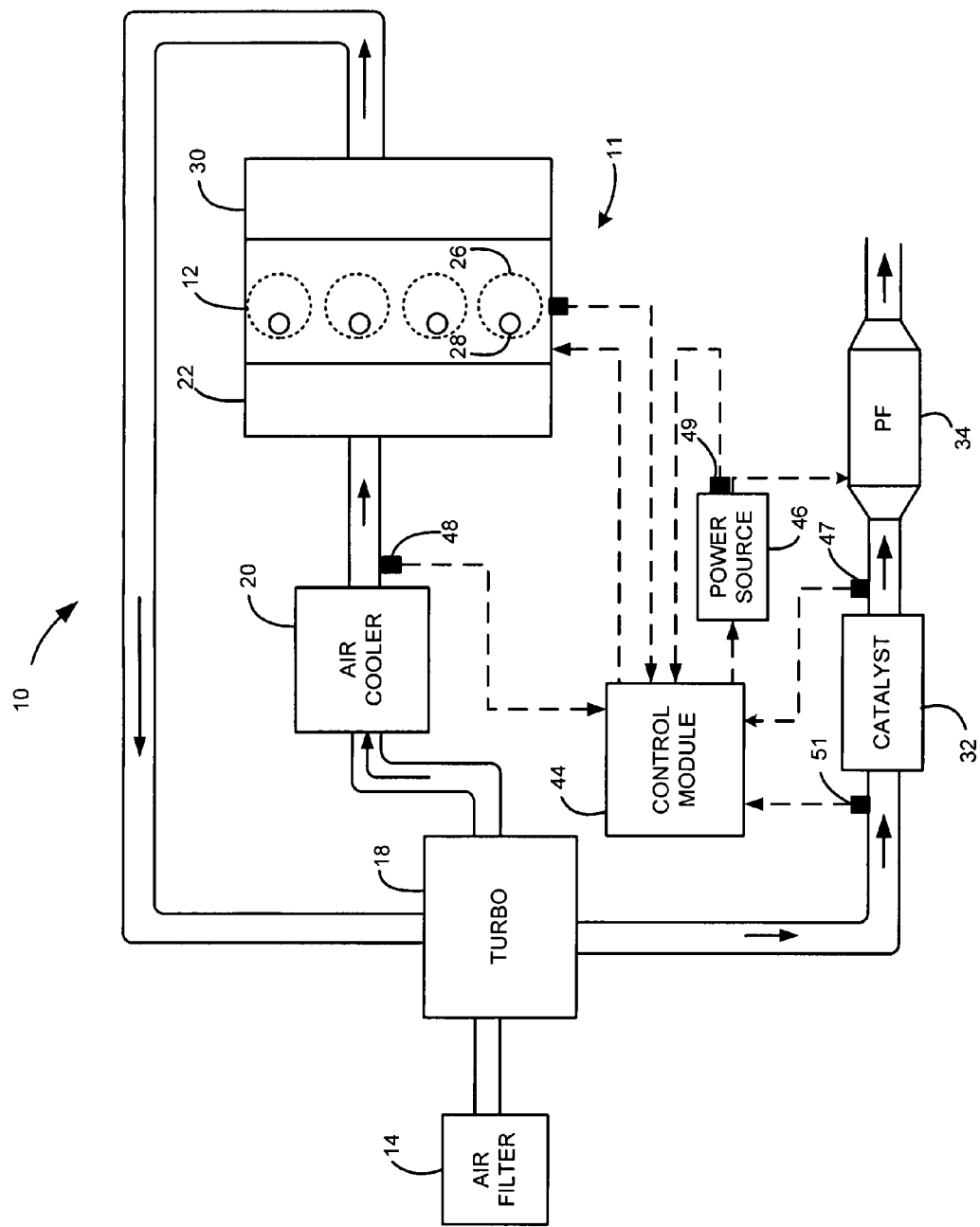
FIG. 1 is a functional block diagram of an exemplary vehicle including a particulate filter and a particulate filter regeneration restart system according to various aspects of the present disclosure.

Referring now to FIG. 1, an exemplary vehicle 10 including an exemplary diesel engine system 11 is illustrated in accordance with various aspects of the present disclosure. It is appreciated that the diesel engine system 11 is merely exemplary in nature and that the particulate filter regeneration restart system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 11 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 11. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PF) 34. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32 and the PF 34. The DOC 32 oxidizes the exhaust based on the post combustion air/fuel ratio. The amount of oxidation increases the temperature of the exhaust. The PF 34 receives exhaust from the DOC 32 and filters any particulate matter present in the exhaust.

A control module 44 controls the engine and PF regeneration based on various sensed and/or modeled information. More specifically, the control module 44 estimates loading of the PF 34. When the estimated loading achieves a threshold level (e.g., 5 grams/liter of particulate matter) and the exhaust flow rate is within a desired range, current is controlled to the PF 34 via a power source 46 to initiate the regeneration process. The duration of the regeneration process varies based upon the amount of particulate matter within the PF 34. It is anticipated, that the regeneration process can last between 1-6 minutes. Current is only applied, however, during an initial portion of the regeneration process. More specifically, the electric energy heats the face of the PF 34 for a threshold period (e.g., approximately 1-2 minutes). Exhaust passing through the front face is heated. The remainder of the regeneration process is achieved using the heat generated by combustion of particulate matter present near the heated face of the PF 34 or by the heated exhaust passing through the PF 34.

In some cases, the combustion of the particulate matter present near the face of the PF 34 is extinguished before complete regeneration of the PF 34 occurs. To prevent such extinguishment, the control module 44 controls the subsequent regeneration activation based on the particulate filter regeneration restart methods and systems of the present disclosure. As will be discussed in more detail below, the control module 44 controls subsequent regeneration activation based on sensed information and/or modeled information. In various embodiments, an exhaust temperature sensor 47 generates an exhaust temperature signal based on a temperature of the exhaust. A mass airflow sensor 48 generates an exhaust air signal based on air entering or exiting the engine 12. A current and/or voltage sensor 49 generates a current and/or voltage signal based on the voltage and/or current supplied by the power source 46 to the PF 34. An oxygen sensor 51 generates an oxygen level signal based on a level of oxygen in the exhaust.

The control module 44 can receive the sensor signals and determine the status of the particulate matter combustion based on one or more of the sensor signals. If the combustion status indicates that the regeneration has stalled, the control module 44 implements a particulate filter loading model to determine when there is enough particulate matter to restart the regeneration procedure and based thereon, restarts the regeneration.

With particular reference to FIG. 2, the PF 34 is preferably a monolith particulate trap and includes alternating closed cells/channels 50 and opened cells/channels 52. The cells/channels 50, 52 are typically square cross-sections, running axially through the part. Walls 58 of the PF 34 are preferably comprised of a porous ceramic honeycomb wall of cordierite material. It is appreciated that any ceramic comb material is considered within the scope of the present disclosure. Adjacent channels are alternatively plugged at each end as shown at 56. This forces the diesel aerosol through the porous substrate walls which act as a mechanical filter. Particulate matter is deposited within the closed channels 50 and exhaust exits through the opened channels 52. Particulate matter particles 59 flow into the PF 34 and are trapped therein.

For regeneration purposes, a grid 64 including an electrically resistive material is attached to the front exterior surface referred to as the front face of the PF 34. Current is supplied to the resistive material to generate thermal energy. It is appreciated that thick film heating technology may be used to attach the grid 64 to the PF 34. For example, a heating material such as Silver or Nichrome may be coated then etched or applied with a mask to the front face of the PF 34. In various other embodiments, the grid 64 is composed of electrically resistive material such as stainless steel and attached to the PF 34 using an adhesive or press fit to the PF 34.

It is also appreciated that the resistive material may be applied in various single or multi-path patterns as shown in FIG. 3. Segments of resistive material can be removed to generate the pathways. In various embodiments a perforated heater insert 70 as shown in FIG. 4 may be attached to the front face of the PF 34. In any of the above mentioned embodiments, exhaust passing through the PF 34 carries thermal energy generated at the front face of the PF 34 a short distance down the channels 50, 52. The increased thermal energy ignites particulate matter present near the inlet of the PF 34. The heat generated from the combustion of the particulates is then directed through the PF 34 to induce combustion of the remaining particulates within the PF 34.

With particular reference to FIG. 5, a thermally conductive coating 72 can be additionally applied at the inlets 62 of the channels 50, 52. The coating 72 can extend a short distance down the opened ends of the closed channels 50. In various embodiments, the conductive coating extends within an inch of the front face of the PF 34. The resistive material of the grid 64 contacts the conductive coating 72. Thermal energy is transferred to the conductive coating 72 when electrical energy passes through the resistive material. Heat from the conductive coating 72 ignites particulate matter present near the inlet of the PF 34.

Referring now to FIG. 6, a dataflow diagram illustrates various embodiments of a particulate filter regeneration restart system that may be embedded within the control module 44. Various embodiments of particulate filter regeneration restart systems according to the present disclosure may include any number of sub-modules embedded within the control module 44. As can be appreciated, the sub-modules shown in FIG. 6 may be combined and/or further partitioned to similarly control regeneration of the PF 34. Inputs to the system may be sensed from the vehicle 10 (FIG. 1), received from other control modules (not shown) within the vehicle 10 (FIG. 1), and/or determined/modeled by other sub-modules (not shown) within the control module 44. In various embodiments, the control module 44 of FIG. 6 includes a propagation module 80, a particulate matter level module 82, and a regeneration module 84.

The propagation module 80 receives as input an exhaust temperature 86, a grid temperature 88, an oxygen level 90, an exhaust flow 92, and a particulate matter level 94. In various embodiments, the grid temperature 88 is determined based on the voltage and/or current signals from the voltage and/or current sensor 49 (FIG. 1). Based on at least one of the exhaust temperature 86, the grid temperature 88, the particulate matter level 94, and the oxygen level 90, the propagation module 80 estimates a combustion temperature of the particulate matter in the PF 34 (FIG. 1). Using the particulate matter combustion temperature and the exhaust flow 92, the propagation module 80 determines a propagation status 95 of the combustion and thus, determines whether the combustion has extinguished. For example, if the regeneration has stalled, the propagation status 95 is set to TRUE. Otherwise, if the regeneration has completed, the propagation status 95 is set to FALSE.

The particulate matter level module 82 receives as input, for example, model parameters 96. The particulate matter level module 82 estimates the level of particulate matter 94 in the PF 34 (FIG. 1) based on one or more particulate matter level estimation methods and the model parameters 96. Such methods can include, but are not limited to, predefined particulate matter models, mileage calculation methods based on known engine particulate matter outputs, and differential pressure methods based on exhaust flow temperatures in and exhaust flow temperatures out of the PF 34 (FIG. 1).

The regeneration module 84 receives as input the level of particulate matter 94 and the propagation status 95. Based on the level of particulate matter 94 estimated to be present in the PF 34 (FIG. 1), the regeneration module 84 controls current via a current control signal 98 to the PF 34 (FIG. 1) to heat the grid 64 (FIG. 2) and ignite the particulate matter present on or near the face of the PF 34 (FIG. 1). The regeneration module 84 reinitiates the regeneration when the propagation status 95 indicates that regeneration has stalled. In various embodiments, the current is controlled based on predetermined thresholds estimated based on the particulate matter level 94 and a substrate type of the PF 34 (FIG. 1).

Referring not to FIG. 7, a flowchart illustrates an exemplary particulate filter regeneration restart method that can be performed by the particulate regeneration restart system of FIG. 6 in accordance with various aspects of the present disclosure. As can be appreciated, the order of execution of the steps of the exemplary particulate filter regeneration restart method can vary without altering the spirit of the method. The exemplary particulate filter regeneration restart method may be scheduled to run based on certain events, for example, after regeneration has commenced.

In one example, the method may begin at 100. The particulate matter combustion temperature is estimated at 110. The propagation status 95 is determined at 120. If the propagation status 95 indicates that a full regeneration has completed at 130, the method may end at 170. Otherwise if the propagation status 95 indicated that regeneration has extinguished before a full regeneration has completed at 130, a particulate matter level 94 is determined at 140. Once the particulate matter level 94 reaches a regeneration threshold at 150, current is supplied to the PF 34 (FIG. 1) at 160 to reinitiate regeneration. Thereafter, the method may end at 170

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system that controls regeneration of a particulate filter, comprising:
    a propagation module that estimates a propagation status of combustion of particulate matter in the particulate filter; and
    a regeneration module that (i) determines whether regeneration of the particulate filter completed based on the propagation status, and that (ii) controls current to the particulate filter to re-initiate regeneration when the regeneration of the particulate filter was not completed and a level of the particulate matter in the particulate filter has increased above a first threshold, wherein the first threshold is less than a second threshold used to initiate regeneration of the particulate filter.

2. The system of claim 1 wherein the propagation module further estimates the propagation status based on at least one of a flow of exhaust and a combustion temperature.

3. The system of claim 2 wherein the propagation module further estimates the combustion temperature based on at least one of a temperature of the exhaust, a level of oxygen in the exhaust, a level of the particulate matter in the particulate filter, and a temperature of the particulate filter.

4. The system of claim 3 further comprising a particulate matter module that estimates the level of the particulate matter in the particulate filter.

5. The system of claim 3 wherein the temperature of the particulate filter is based on a temperature of a resistive grid of the particulate filter.

6. The system of claim 3 wherein the temperature of the particulate filter is based on the current supplied to the particulate filter and a voltage supplied to the particulate filter.

7. A method that controls regeneration of a particulate filter, comprising:
    estimating a propagation status of combustion of particulate matter in the particulate filter;
    determining whether regeneration of the particulate filter completed based on the propagation status; and
    controlling current to the particulate filter to re-initiate regeneration of the particulate filter when the regeneration of the particulate filter was not completed and a level of the particulate matter in the particulate filter has increased above a first threshold, wherein the first threshold is less than a second threshold used to initiate regeneration of the particulate filter.

8. The method of claim 7 wherein the estimating the propagation status is based on at least one of a flow of exhaust and a combustion temperature.

9. The method of claim 8 further comprising estimating the combustion temperature based on at least one of a temperature of the exhaust, a level of oxygen in the exhaust, a level of the particulate matter in the particulate filter, and a temperature of the particulate filter.

10. The method of claim 9 further comprising estimating the level of the particulate matter in the particulate filter.

11. The method of claim 9 further comprising determining the temperature of the particulate filter based on a temperature of a resistive grid of the particulate filter.

12. The method of claim 9 wherein the determining the temperature of the particulate filter is based on the current supplied to the particulate filter and a voltage supplied to the particulate filter.

13. A vehicle, comprising:
    a particulate filter that filters particulate matter from engine exhaust wherein an upstream end of the particulate filter receives the engine exhaust;
    a grid of electrically resistive material that is applied to an exterior upstream surface of the particulate filter and that selectively heats exhaust passing through the grid to initiate combustion of the particulate matter within the particulate filter; and
    a control module that (i) estimates a propagation status of the combustion of the particulate matter in the particulate filter, (ii) determines whether regeneration of the particulate filter completed based on the propagation status, and (iii) and that controls current to the grid to re-initiate regeneration of the particulate filter when the regeneration of the particulate filter was not completed and a level of the particulate matter in the particulate filter has increased above a first threshold, wherein the first threshold is less than a second threshold used to initiate regeneration of the particulate filter.

14. The vehicle of claim 13 wherein the control module estimates the propagation status based on at least one of a flow of the engine exhaust and a combustion temperature.

15. The vehicle of claim 14 wherein the control module further estimates the combustion temperature based on at least one of a temperature of the engine exhaust, a level of oxygen in the engine exhaust, a level of the particulate matter in the particulate filter, and a temperature of the particulate filter.

16. The vehicle of claim 15 wherein the control module determines the temperature of the particulate filter based on a temperature of the grid.

17. The vehicle of claim 15 wherein the control module determines the temperature of the particulate filter based on the current supplied to the grid and a voltage supplied to the grid.

18. The system of claim 1, wherein the first threshold corresponds to a minimum level of the particulate matter for preventing damage to the particulate filter due to thermal stress during regeneration.

19. The system of claim 4, wherein the particulate matter module estimates the level of the particulate matter in the particulate filter using one of (i) predefined particulate matter models, (ii) mileage calculation methods based on known engine particulate matter outputs, and (iii) differential pressure methods based on exhaust flow temperatures in and out of the particulate filter.

20. The method of claim 7, wherein the first threshold corresponds to a minimum level of the particulate matter for preventing damage to the particulate filter due to thermal stress during regeneration.

21. The method of claim 10, wherein the level of the particulate matter in the particulate filter is estimated using one of (i) predefined particulate matter models, (ii) mileage calculation methods based on known engine particulate matter outputs, and (iii) differential pressure methods based on exhaust flow temperatures in and out of the particulate filter.

22. The vehicle of claim 13, wherein the first threshold corresponds to a minimum level of the particulate matter for preventing damage to the particulate filter due to thermal stress during regeneration.

23. The vehicle of claim 13, wherein the control module estimates a level of the particulate matter in the particulate filter using one of (i) predefined particulate matter models, (ii) mileage calculation methods based on known engine particulate matter outputs, and (iii) differential pressure methods based on exhaust flow temperatures in and out of the particulate filter.

* * * * *